United States Patent
Topolovec et al.

(10) Patent No.: US 10,392,851 B2
(45) Date of Patent: Aug. 27, 2019

(54) APPARATUS AND METHOD FOR CLOSING A LIFTGATE OF A MOTOR VEHICLE

(71) Applicant: FORD GLOBAL TECHNOLOGIES, LLC, Dearborn, MI (US)

(72) Inventors: Frank Joseph Topolovec, Canton, MI (US); Timothy P. Covert, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 15/455,228

(22) Filed: Mar. 10, 2017

(65) Prior Publication Data
US 2018/0258679 A1  Sep. 13, 2018

(51) Int. Cl.
*E05B 1/00* (2006.01)
*E05F 11/54* (2006.01)
*B60J 5/10* (2006.01)
*E05F 7/00* (2006.01)

(52) U.S. Cl.
CPC ............... *E05F 11/54* (2013.01); *B60J 5/101* (2013.01); *E05F 7/00* (2013.01); *E05Y 2201/68* (2013.01); *E05Y 2400/85* (2013.01); *E05Y 2800/122* (2013.01); *E05Y 2900/532* (2013.01); *E05Y 2900/546* (2013.01)

(58) Field of Classification Search
CPC .... B60J 5/101; B60J 5/10; E05F 11/10; E05F 15/43; E05F 15/63; E05F 1/1083; E05Y 2900/532; E05Y 2201/434; E05Y 2201/604; E05Y 2201/618; E05Y 2600/13; E05Y 2400/44; E05Y 2900/546; E05B 81/62; E05B 81/64

USPC .............. 49/460, 461, 465; 296/146.4, 146.1
See application file for complete search history.

(56) References Cited

U.S. PATENT DOCUMENTS

| | | | |
|---|---|---|---|
| 5,563,483 A * | 10/1996 | Kowall | E05B 81/14 318/266 |
| 5,851,050 A * | 12/1998 | Squire | E05F 15/49 296/146.4 |
| 6,152,502 A | 11/2000 | Rossi | |
| 6,371,549 B2 | 4/2002 | Kim | |
| 6,385,816 B1 | 5/2002 | Baldas et al. | |
| 6,411,054 B1 * | 6/2002 | Van Wiemeersch | G07C 9/00182 318/266 |
| 6,719,356 B2 * | 4/2004 | Cleland | E05F 1/1091 296/146.8 |

(Continued)

FOREIGN PATENT DOCUMENTS

KR  100868164 B1  11/2008
WO  W2010109083 A1  9/2010

OTHER PUBLICATIONS

English Machine Translation of WO2010109083A1.

*Primary Examiner* — Chi Q Nguyen
(74) *Attorney, Agent, or Firm* — Jason Rogers; Vichit Chea; King & Schickli, PLLC

(57) ABSTRACT

An apparatus is provided for closing a liftgate. That apparatus includes a handle displaceable between a stowed position and a deployed position, a latch to releasably hold the handle in the stowed position, an actuator to displace the handle into the deployed position and a release feature to release the latch and deploy the handle. A liftgate assembly incorporating that apparatus and a method of closing a liftgate are also disclosed.

18 Claims, 4 Drawing Sheets

(56) References Cited

U.S. PATENT DOCUMENTS

| | | | | |
|---|---|---|---|---|
| 6,893,203 | B2* | 5/2005 | Anderson | B60P 1/44 414/467 |
| 7,070,226 | B2* | 7/2006 | Cleland | E05F 1/1091 296/146.8 |
| 7,156,447 | B2* | 1/2007 | Watanabe | E05F 15/63 296/146.4 |
| 2003/0044266 | A1* | 3/2003 | Vandillen | A61G 3/061 414/537 |
| 2006/0181108 | A1* | 8/2006 | Cleland | E05F 15/43 296/146.4 |
| 2009/0079207 | A1 | 3/2009 | Manzhura et al. | |
| 2009/0222174 | A1* | 9/2009 | Frommer | E05F 15/70 701/49 |
| 2015/0331030 | A1* | 11/2015 | Conner | E05B 81/62 324/503 |
| 2016/0039365 | A1* | 2/2016 | Vanderwall | B60R 25/24 701/36 |
| 2018/0038139 | A1* | 2/2018 | Zindler | E05B 81/20 |

\* cited by examiner

APPARATUS AND METHOD FOR CLOSING A LIFTGATE OF A MOTOR VEHICLE

TECHNICAL FIELD

This document relates generally to the motor vehicle equipment field and, more particularly, to an apparatus and method for assisting an individual in closing a liftgate of a motor vehicle.

BACKGROUND

When a liftgate is raised into a fully opened position, it may be difficult for an individual to reach the handle or edge of the liftgate because of the height above the ground. This can be particularly true for sport utility vehicle or crossover operators who are of relatively short stature.

One way to address and alleviate this difficulty is to provide a powered liftgate which may be closed by the simple operation of an actuator switch provided on a key fob or at a conveniently reached location on the motor vehicle. This document relates to a more lightweight and economical alternative to a motorized liftgate closing system and, more particularly, to a simple apparatus and method for aiding one in closing a liftgate.

SUMMARY

In accordance with the purposes and benefits described herein, an apparatus is provided for closing a liftgate on a motor vehicle. That apparatus comprises a handle that is displaceable between a stowed position and a deployed position. Further, that apparatus includes a latch to releasably hold the handle in the stowed position as well as an actuator to displace the handle into the deployed position. Further, that apparatus includes a release feature to release the latch and deploy the handle. The release feature includes a remote activator.

The remote activator of the release feature may comprise a key fob or an actuator switch conveniently located at a position on the motor vehicle that is easily reached and remote from the liftgate.

The release feature may further include a controller configured to respond to the remote activator and unlatch the latch. Still further, the release feature may include a solenoid to displace the latch into an unlatched position.

The actuator may comprise a biasing element biasing the handle toward the deployed position. In addition, the apparatus may include an abutment oriented to engage the handle as the liftgate is closed and thereby displace the handle into the stowed position.

In accordance with an additional aspect, a liftgate assembly is provided for a motor vehicle. That liftgate assembly comprises a liftgate body and a handle carried on the liftgate body. The handle is displaceable between a stowed position and a deployed position. The liftgate assembly also includes a latch to releasably hold the handle in the stowed position and an actuator to displace the handle into the deployed position. Further, the liftgate assembly includes a release feature to release the latch and deploy the handle. That release feature includes a remote activator.

The remote activator may comprise and key fob or an activator switch located at a convenient position on the motor vehicle remote from the liftgate body.

The release feature may include a controller configured to respond to the remote activator and unlatch the latch.

Further, the release feature may include a solenoid to displace the latch into an unlatched position.

The actuator may comprise a biasing element for biasing the handle toward the deployed position. In one of many possible embodiments, the actuator may comprise a compression spring.

The liftgate assembly may further include an abutment. That abutment may be carried on the motor vehicle and oriented to engage the handle as the liftgate is closing. The abutment may function to displace the handle into the stowed position following engagement with the handle. When in the stowed position the handle may be retracted into the liftgate body.

In accordance with yet another aspect, a method is provided of closing a liftgate of a motor vehicle. That method may comprise the step of configuring a controller to deploy a handle from the liftgate body in response to a signal from a remote activator.

Further, the method may include releasing, by the controller, a latch holding the handle in a stowed position. In addition the method may include the step of biasing, by an activator, the handle into a deployed position. Further, the method may include the step of using a key fob as the remote activator. In addition the method may include engaging the handle with an abutment carried on the motor vehicle as the liftgate is closed. Still further, the method may include the step of returning the handle to the stowed position by engagement with the abutment.

In the following description, there are shown and described several preferred embodiments of the apparatus, for closing a liftgate, the liftgate assembly and the method of closing a liftgate. As it should be realized, the apparatus, liftgate assembly and related method are capable of other, different embodiments and their several details are capable of modification in various, obvious aspects all without departing from the liftgate, the liftgate assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the liftgate closing apparatus, liftgate assembly and related liftgate closing method, and together with the description serve to explain certain principles thereof.

Reference will now be made in detail to the present preferred embodiments of the apparatus and liftgate assembly, examples of which are illustrated in the accompanying drawing figures.

DETAILED DESCRIPTION

Figure 1:
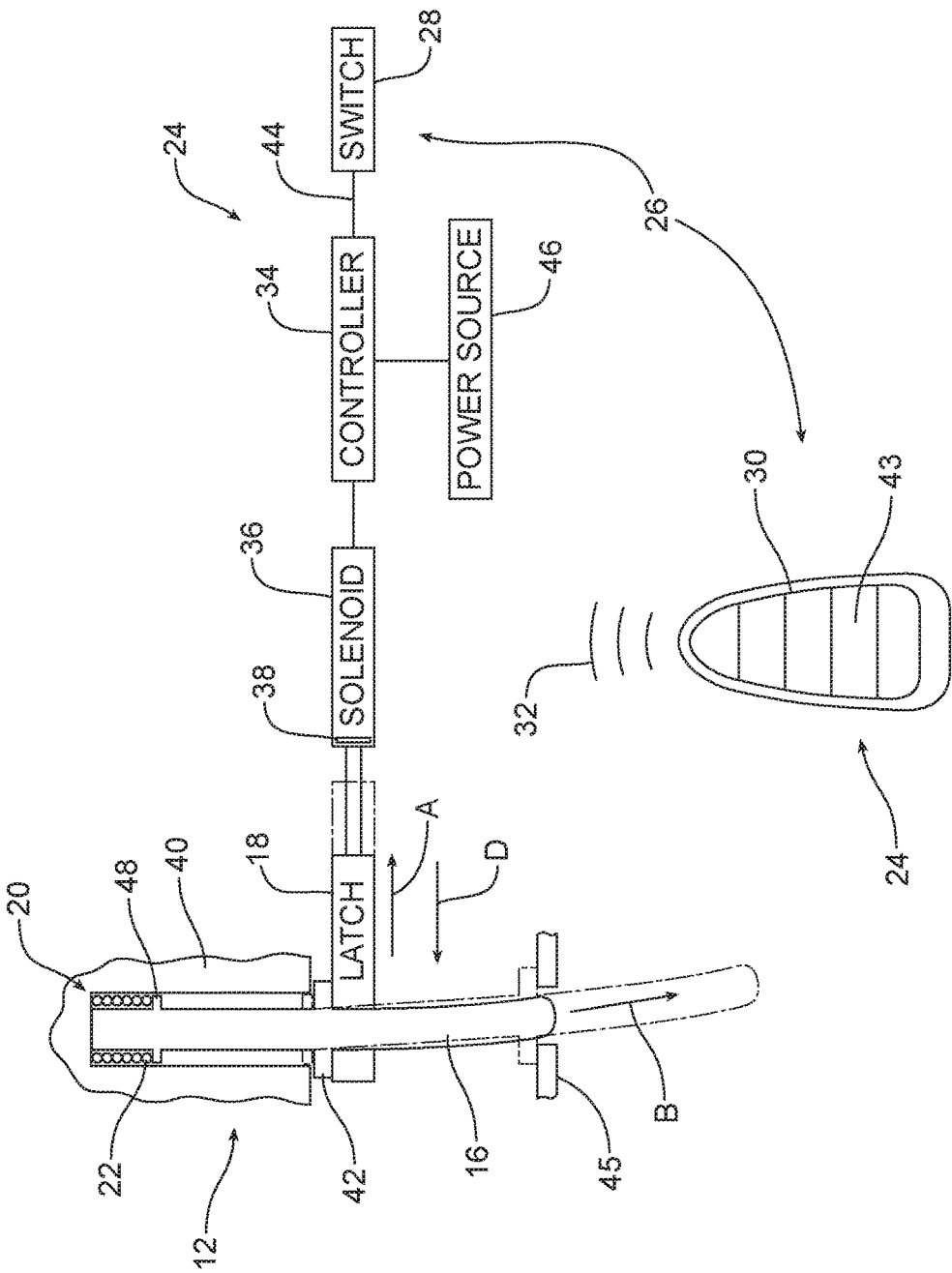
FIG. 1 is a schematic block diagram of the apparatus for closing a liftgate.
Figure 2:
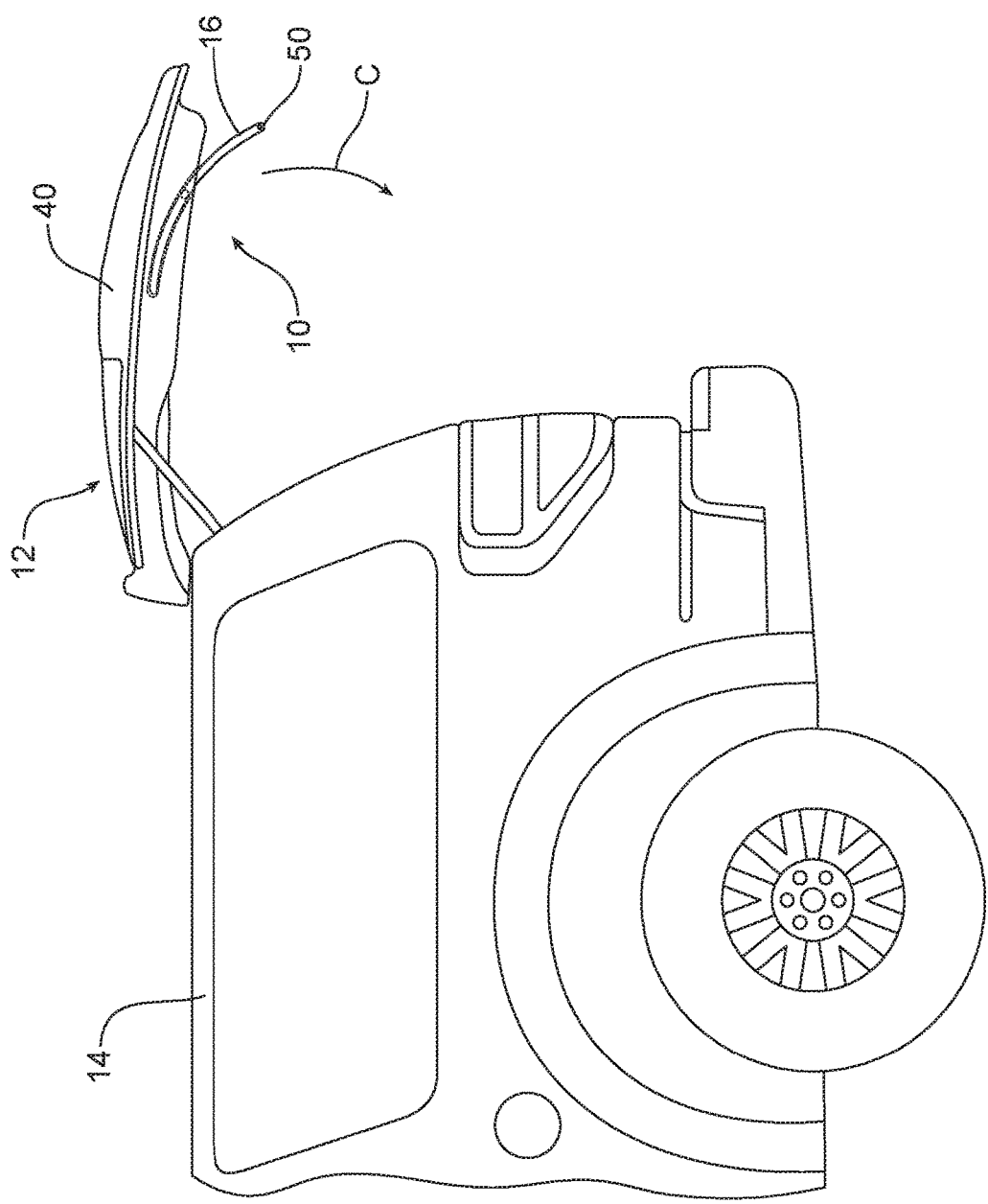
FIG. 2 is a side elevational illustration of a liftgate assembly illustrating the liftgate body in an open position with the handle illustrated in phantom line in the stowed position and in full line in the deployed position.
Figure 3:
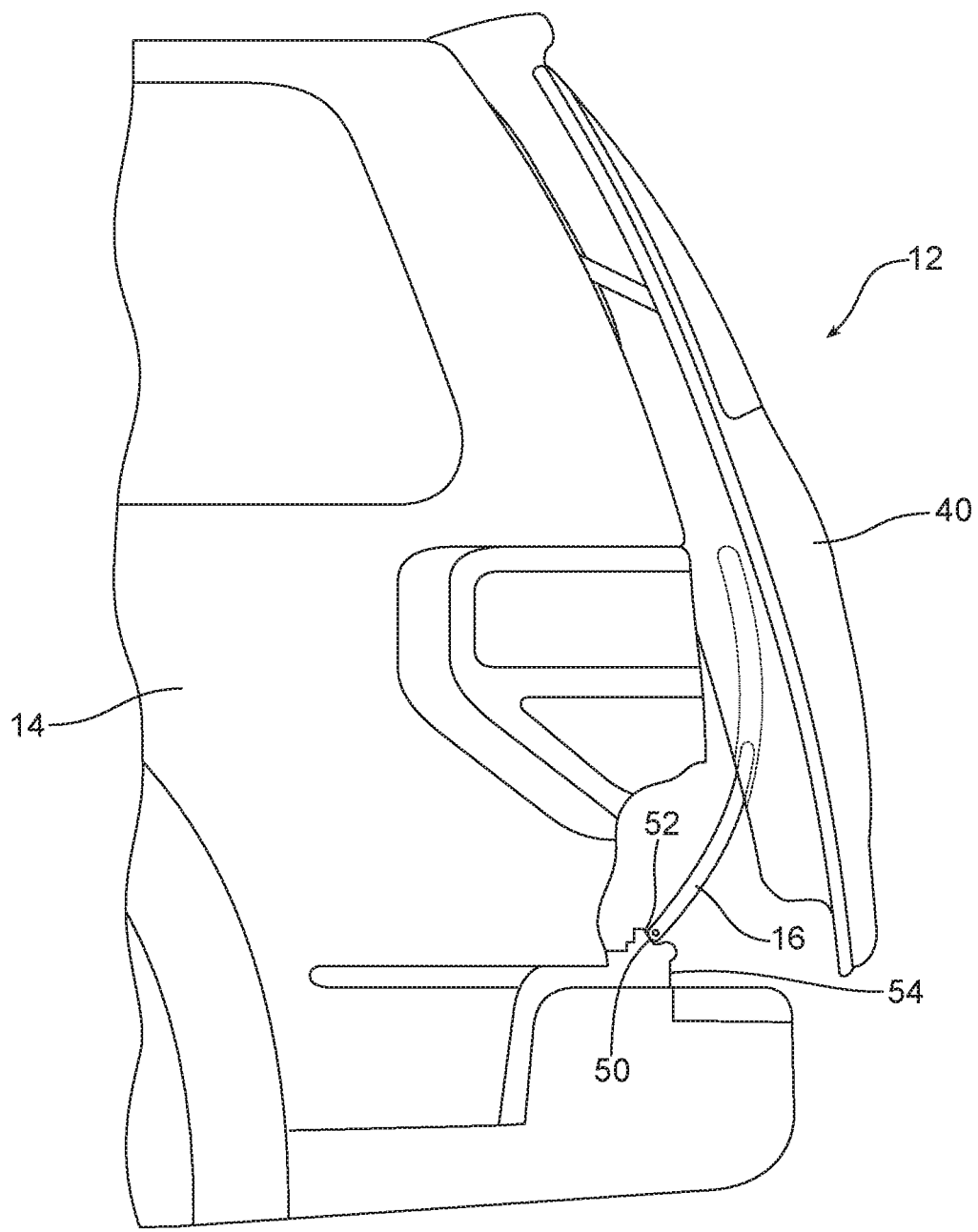
FIG. 3 is a schematic illustration of how the end of the handle engages an abutment on the motor vehicle as the liftgate is being closed, the abutment functioning to displace the handle into the stowed position during the closing of the liftgate body.

Reference is now made to FIG. 1-3 schematically illustrating an apparatus 10 for aiding an individual in closing a liftgate assembly 12 on a motor vehicle 14. The apparatus 10 includes a handle 16 that is displaceable between a stowed position illustrated in full line in FIG. 1 and phantom line in FIG. 2 and a deployed position illustrated in phantom line in FIG. 1 and full line in FIG. 2. In the illustrated embodiment, the handle 16 is arcuate and has a constant radius of curvature. The handle 16 may assume other shapes such as straight.

As illustrated in FIG. 1, the apparatus 10 also includes a latch 18 to releasably hold the handle 16 in the stowed position. The apparatus 10 also includes an actuator 20 to displace the handle 16 into the deployed position. In the illustrated embodiment, the actuator 20 may comprise a biasing element such as the compression spring 22. The compression spring 22 is received concentrically around the handle 16.

As further illustrated in FIG. 1, the apparatus 10 includes a release feature, generally designated by reference numeral 24. The release feature 24 functions to release the latch 18 so as to allow deployment of the handle 16 by the actuator 20.

In the illustrated embodiment, the release feature 24 includes a remote activator 26. The remote activator 26 may comprise a dedicated switch 28 carried on the motor vehicle at a remote location from the liftgate assembly 12 such as along an interior trim panel of a storage area of the motor vehicle behind the rear seat. Alternatively, the remote activator 26 may comprise a key fob 30 which generates a wireless control signal represented at 32.

The remote activator also includes a controller 34. The controller 34 comprises a computing device such as a dedicated microprocessor or an electronic control unit (ECU) operating in accordance with instructions from appropriate control software. Thus, the controller may comprise one or more processors, one or more memories, and one or more network interfaces all in communication with each other over a communication bus.

As further illustrated in FIG. 1, the release feature 24 may also include a solenoid 36 under the control of the controller 34. The solenoid 36 is connected to the latch 18 and includes a biasing spring 38 to bias the latch into a normally latched position for holding the handle 16 in the stowed position. In the latched position, the latch 18 engages the flange 42 on the handle 16.

The operation and opening of the liftgate assembly 12 will now be discussed in detail. When the liftgate body 40 is opened, the handle 16 is held in the stowed position by the latch 18 fully retracted within the body 40 of the liftgate assembly 12. Note FIG. 2 showing the liftgate body 40 in the fully raised position with the handle 16 shown in phantom line in the stowed position. When an operator wishes to access the handle 16, that operator may utilize the easily accessible remote activator 26. Thus, the operator may depress an appropriate control button 43 on the key fob 30 to generate a wireless control signal 32 received by the controller 34. Alternatively, the operator may manipulate the remote switch 28 to provide an appropriate control signal to the controller 34 through the control line 44. In response to the signal from the remote activator 26, the controller 34 energizes the solenoid 36 with energy from the power source 46 of the motor vehicle. The solenoid 36 then displaces the latch 18 in the direction of action arrow A freeing the latch from the flange 42 on the handle 16. The actuator 20/compression spring 22 then pushes against the shoulder 48 on the handle 16 and functions to bias the handle in the direction of action arrow B displacing the handle from the stowed position to the deployed position (note full line position of handle in FIG. 2) where the flange 42 engages the stop 45 on the liftgate body 40. In this position, the handle 16 extends downward from the body 40 of the liftgate assembly 12 to a lower height that is more easily reached by the operator.

The operator may initially grab the handle 16 to pull the liftgate assembly 12 down toward the closed position (note action arrow C in FIG. 2). As the liftgate assembly 12 is lowered, the operator may release the handle 16 and grab an alternative hand hold on the liftgate assembly 12. As the operator continues to close the liftgate assembly 12 the end 50 of the handle 16 engages a handle abutment 52 carried on the motor vehicle adjacent the liftgate sill 54. In the illustrated embodiment, the abutment 52 is oriented at an angle of inclination to put a closing force directly into the end 50 of the handle 16.

As the liftgate assembly 12 continues to close, the handle abutment 52 functions to displace the handle 16 back into the stowed position where the handle is fully recessed within the body 40 of the liftgate assembly 12. Upon reaching the stowed position, the spring 38 of the solenoid 36 biases the latch 18 back into engagement with the flange 42 on the handle 16 in the direction of action arrow D. The shoulder 48 on the handle 16 functions to again compress the actuator 20/compression spring 22 thereby reloading biasing force while the latch 18 secures the handle in the stowed position until the next time the remote activator 26 is utilized to deploy the handle. The liftgate latch (not shown) maintains the liftgate assembly 12 of the motor vehicle 14 closed.

The apparatus 10 provides a very effective way for closing a liftgate assembly 12 of a motor vehicle 14. That method of closing comprises the step of configuring the controller 34 to deploy a handle 16 from the liftgate body 12 in response to a control signal from a remote activator 26.

That method includes releasing, by the controller 34, the latch 18 holding the handle 16 in the stowed position. Further, the method includes biasing, by the actuator 20/compression spring 22, the handle 16 into the deployed position. The method may further include the step of using a key fob 30 as the remote activator 26. In addition the method may include engaging the handle 16 with an abutment 52 carried on the motor vehicle 14 as the liftgate body 40 is closed. Further, the method may include returning the handle 16 to the stowed position by engagement of the end 50 of the handle with the abutment 52.

Advantageously, the apparatus 10 and the related closing method provide a simple, efficient and relatively inexpensive system for aiding a user in reaching and closing a liftgate assembly 12 of a motor vehicle 14.

The foregoing has been presented for purposes of illustration and description. It is not intended to be exhaustive or to limit the embodiments to the precise form disclosed. Obvious modifications and variations are possible in light of the above teachings.

Figure 4:
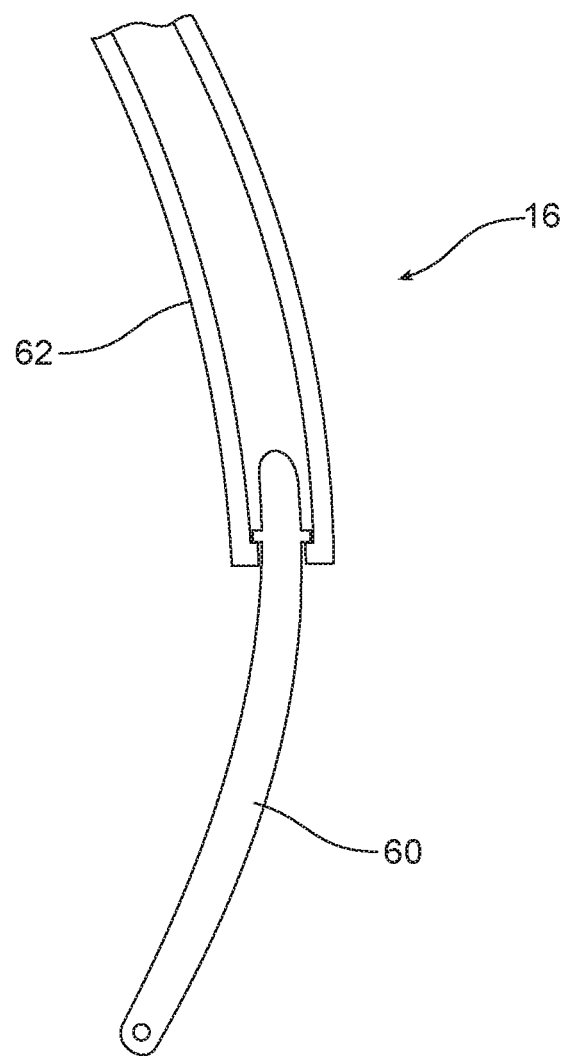
FIG. 4 illustrates an alternative embodiment of the handle incorporating a telescoping configuration.

For example, as illustrated in FIG. 4, the handle 16 may be made extendable by providing two telescoping sections 60, 62. In other alternative embodiments, the translating handle 16 illustrated in FIGS. 1-4 may be replaced by a pivoting handle and the compression spring 22 for the actuator 20 may be replaced by a torsion spring. Further, while the illustrated embodiment includes the abutment 52 to return the handle 16 to the stowed position when the liftgate body 40 is closed, it should be appreciated that the operator may simply push the handle back into the stowed position if desired. Thus, the abutment 52 is an optional feature. All such modifications and variations are within the scope of the appended claims when interpreted in accordance with the breadth to which they are fairly, legally and equitably entitled.

What is claimed:

1. An apparatus for closing a liftgate, comprising:
   a handle displaceable between a stowed position and a deployed position;
   a latch to releasably hold said handle in said stowed position;
   an actuator to displace said handle into said deployed position; and
   a release feature to release said latch and deploy said handle, said release feature including a remote activator.

2. The apparatus of claim 1, wherein said release feature further includes a controller configured to respond to said remote activator and unlatch said latch.

3. The apparatus of claim 2, wherein said remote activator is a key fob.

4. The apparatus of claim 3, wherein said release feature further includes a solenoid to displace said latch into an unlatched position.

5. The apparatus of claim 4, wherein said actuator comprises a biasing element biasing said handle toward said deployed position.

6. The apparatus of claim 5, further including an abutment oriented to engage said handle as said liftgate is closed and displace said handle into said stowed position.

7. A liftgate assembly for a motor vehicle, comprising:
   a liftgate body;
   a handle carried on said liftgate body, said handle being displaceable between a stowed position and a deployed position;
   a latch to releasably hold said handle in said stowed position;
   an actuator to displace said handle into said deployed position; and
   a release feature to release said latch and deploy said handle, said release feature including a remote activator.

8. The liftgate assembly of claim 7, wherein said release feature includes a controller configured to respond to said remote activator and unlatch said latch.

9. The liftgate assembly of claim 8, wherein said remote activator is a key fob.

10. The liftgate assembly of claim 9, wherein said release feature further includes a solenoid to displace said latch into an unlatched position.

11. The liftgate assembly of claim 10, wherein said actuator comprises a biasing element biasing said handle toward said deployed position.

12. The liftgate assembly of claim 11, further including an abutment carried on said motor vehicle and oriented to engage said handle as said liftgate assembly is closing and displace said handle into said stowed position.

13. The liftgate assembly of claim 12, wherein said handle is retracted into said liftgate body when in said stowed position.

14. The liftgate assembly of claim 13, wherein said biasing element is a compression spring.

15. A method of closing a liftgate of a motor vehicle, comprising:
    sending a control signal from a remote activator to a controller;
    releasing, by a controller, a latch holding a handle in a stowed position; and
    biasing, by an actuator, said handle into a deployed position whereby said handle may be engaged and used to close said liftgate.

16. The method of claim 15, further including using a key fob as said remote activator.

17. The method of claim 16, further including engaging said handle with an abutment carried on said motor vehicle as said liftgate is closed.

18. The method of claim 17, further including returning said handle to said stowed position by engagement with said abutment.

* * * * *